(12) United States Patent
Quioc

(10) Patent No.: US 7,806,954 B2
(45) Date of Patent: Oct. 5, 2010

(54) GAS GENERATOR

(75) Inventor: Eduardo L. Quioc, Westland, MI (US)

(73) Assignee: Automotive Systems Laboratory Inc., Armada, MI (US)

( * ) Notice: Subject to any disclaimer, the term of this patent is extended or adjusted under 35 U.S.C. 154(b) by 710 days.

(21) Appl. No.: 11/591,321

(22) Filed: Oct. 31, 2006

(65) Prior Publication Data

US 2007/0095035 A1    May 3, 2007

Related U.S. Application Data

(60) Provisional application No. 60/732,569, filed on Nov. 1, 2005.

(51) Int. Cl.
*B60R 21/26* (2006.01)
*B60R 21/28* (2006.01)

(52) U.S. Cl. .................. 55/385.3; 55/385.1; 102/202.7; 102/202.9; 102/202.14; 102/531; 280/734; 280/736; 280/741; 280/728.1; 280/737; 280/742; 149/36; 149/46; 149/47; 242/374; 422/166; 422/167

(58) Field of Classification Search ................ 55/385.1, 55/385.3; 102/202.7, 202.9, 202.14, 531; 280/734, 736, 741, 728.1, 737, 742; 149/36, 149/46, 47; 242/374; 422/166, 167
See application file for complete search history.

(56) References Cited

U.S. PATENT DOCUMENTS

| 2,891,525 A | 6/1959 | Moore ..................... 123/90.51 |
| 3,794,347 A | 2/1974 | Zens ........................... 280/150 |
| 3,877,882 A | 4/1975 | Lette et al. |
| 3,880,447 A | 4/1975 | Thorn et al. |
| 3,958,949 A | 5/1976 | Plantif et al. |
| 3,985,076 A | 10/1976 | Schneiter et al. |
| 4,001,750 A | 1/1977 | Scherer et al. .............. 337/280 |
| 4,012,189 A | 3/1977 | Vogt et al. .................. 431/353 |
| 4,215,631 A | 8/1980 | Rucker ........................ 102/27 |
| 4,530,516 A | 7/1985 | Adams et al. ............... 280/741 |

(Continued)

FOREIGN PATENT DOCUMENTS

DE    40 19 877 A1    6/1990

(Continued)

OTHER PUBLICATIONS

Office Action U.S. Appl. No. 11/167,849, filed Jun. 27, 2005 dated for Feb. 3, 2010 (88).
Office Action U.S. Appl. No. 11/108,559, filed Apr. 18, 2005 dated for Oct. 13, 2006.
Office Action U.S. Appl. No. 11/108,559, filed Apr. 18, 2005 dated for Apr. 13, 2007.

(Continued)

*Primary Examiner*—Robert A Hopkins
*Assistant Examiner*—Minh-Chau T Pham
(74) *Attorney, Agent, or Firm*—L.C. Begin & Associates, PLLC

(57) ABSTRACT

A gas generator 10 contains a baffle assembly for cooling of gases. An imperforate housing 46 is contained within the gas generator 10. A perforate housing 30 is contained within the imperforate housing 46. At least one orifice 70/72 is formed within the baffle assembly, where the orifice 70/72 is formed at the juncture 57 of the baffle assembly 12 and the perforate housing 30, at a second end of the perforate housing 30. Upon activation of the gas generator 10, gases produced are shunted through the orifice 70/72 and into the baffle assembly 12 for cooling and filtration thereof.

10 Claims, 1 Drawing Sheet

U.S. PATENT DOCUMENTS

| | | | |
|---|---|---|---|
| 4,611,374 A | 9/1986 | Schnello et al. | 29/890.13 |
| 4,730,558 A | 3/1988 | Florin et al. | 102/218 |
| 4,762,067 A | 8/1988 | Barker et al. | 102/313 |
| 4,950,458 A | 8/1990 | Cunningham | 422/164 |
| 5,028,070 A | 7/1991 | Bender | |
| 5,048,862 A | 9/1991 | Bender et al. | |
| 5,100,171 A | 3/1992 | Faigle et al. | 280/736 |
| 5,318,323 A | 6/1994 | Pietz | |
| 5,333,656 A | 8/1994 | Mackal | 141/330 |
| 5,372,449 A | 12/1994 | Bauer et al. | 403/273 |
| 5,387,009 A | 2/1995 | Lauritzen et al. | |
| 5,443,286 A | 8/1995 | Cunningham et al. | |
| 5,509,686 A | 4/1996 | Shepherd et al. | 280/738 |
| 5,516,147 A | 5/1996 | Clark et al. | 280/737 |
| 5,533,751 A | 7/1996 | Kort et al. | 280/737 |
| 5,562,304 A | 10/1996 | Gest | |
| 5,564,743 A | 10/1996 | Marchant | 280/741 |
| 5,582,427 A | 12/1996 | Rink et al. | 280/740 |
| 5,588,676 A * | 12/1996 | Clark et al. | 280/741 |
| 5,601,308 A * | 2/1997 | Cuevas | 280/736 |
| 5,611,566 A | 3/1997 | Simon et al. | 280/736 |
| 5,613,703 A | 3/1997 | Fischer | 280/741 |
| 5,622,380 A | 4/1997 | Khandhadia et al. | 280/736 |
| 5,624,133 A | 4/1997 | Wong | |
| 5,628,528 A | 5/1997 | DeSautelle et al. | 280/736 |
| 5,630,619 A | 5/1997 | Buchanan et al. | 280/741 |
| 5,662,722 A | 9/1997 | Shiban | 55/413 |
| 5,702,494 A | 12/1997 | Tompkins et al. | 55/498 |
| 5,725,245 A | 3/1998 | O'Driscoll et al. | |
| 5,799,973 A | 9/1998 | Bauer et al. | 280/741 |
| 5,813,695 A | 9/1998 | O'Driscoll et al. | |
| 5,829,785 A | 11/1998 | Jordan et al. | 280/741 |
| 5,845,935 A | 12/1998 | Enders et al. | 280/743.2 |
| 5,860,672 A | 1/1999 | Petersen | 280/728.2 |
| 5,872,329 A | 2/1999 | Burns et al. | 149/36 |
| 5,934,705 A | 8/1999 | Siddiqui et al. | 280/736 |
| 5,941,562 A | 8/1999 | Rink et al. | 280/741 |
| 5,951,040 A * | 9/1999 | McFarland et al. | 280/736 |
| 5,970,880 A | 10/1999 | Perotto | 102/531 |
| 6,019,389 A | 2/2000 | Burgi et al. | 280/736 |
| 6,032,979 A | 3/2000 | Mossi et al. | 280/741 |
| 6,095,556 A | 8/2000 | Bailey et al. | 280/737 |
| 6,095,559 A | 8/2000 | Smith et al. | |
| 6,095,561 A | 8/2000 | Siddiqui et al. | 280/472 |
| 6,106,000 A | 8/2000 | Stewart | 280/728.2 |
| 6,116,491 A | 9/2000 | Kutoh | 228/42 |
| 6,129,381 A * | 10/2000 | Katsuda et al. | 280/741 |
| 6,149,193 A | 11/2000 | Canterberry et al. | 280/736 |
| 6,210,505 B1 | 4/2001 | Khandhadia et al. | 149/36 |
| 6,244,623 B1 | 6/2001 | Moore et al. | 280/471 |
| 6,290,256 B1 * | 9/2001 | McFarland et al. | 280/736 |
| 6,379,627 B1 | 4/2002 | Nguyen et al. | |
| 6,464,254 B2 | 10/2002 | Chikaraishi et al. | 280/741 |
| 6,485,053 B2 | 11/2002 | Fujimoto | 280/741 |
| 6,581,963 B2 | 6/2003 | Mangun | 280/741 |
| 6,776,434 B2 | 8/2004 | Ford et al. | 280/729 |
| 6,846,014 B2 | 1/2005 | Rink et al. | 280/740 |
| 6,851,705 B2 | 2/2005 | Young et al. | |
| 6,854,764 B2 | 2/2005 | Larsen et al. | 280/741 |
| 6,871,873 B2 | 3/2005 | Quioc et al. | 280/741 |
| 6,908,104 B2 | 6/2005 | Canterberry et al. | 280/736 |
| 6,935,655 B2 | 8/2005 | Longhurst et al. | 280/741 |
| 6,945,561 B2 * | 9/2005 | Nakashima et al. | 280/736 |
| 6,976,702 B2 | 12/2005 | Yakota et al. | 280/730.2 |
| 7,052,040 B2 | 5/2006 | Matsuda et al. | 280/741 |
| 7,055,855 B2 * | 6/2006 | Nakashima et al. | 280/736 |
| 7,073,820 B2 | 7/2006 | McCormick | 280/741 |
| 7,150,227 B2 * | 12/2006 | Matsuda | 102/202 |
| 7,178,829 B2 | 2/2007 | Blackburn | 280/736 |
| 7,178,830 B2 | 4/2007 | Blackburn | 280/736 |
| 7,207,597 B2 * | 4/2007 | Iwai et al. | 280/742 |
| 7,237,801 B2 | 7/2007 | Quioc et al. | 280/736 |
| 7,267,365 B2 | 9/2007 | Quioc | 280/736 |
| 7,338,074 B2 * | 3/2008 | Schonhuber et al. | 280/742 |
| 7,343,862 B2 | 3/2008 | McCormick | 102/530 |
| 7,427,082 B2 * | 9/2008 | Schoenhuber | 280/736 |
| 7,467,588 B2 * | 12/2008 | Matsuda et al. | 102/530 |
| 7,654,565 B2 | 2/2010 | McCormick et al. | 280/736 |
| 2003/0051630 A1 * | 3/2003 | Katsuda et al. | 102/531 |
| 2003/0201628 A1 | 10/2003 | Choudhury et al. | |
| 2004/0046373 A1 | 3/2004 | Wang et al. | |
| 2004/0051289 A1 * | 3/2004 | Miyaji et al. | 280/741 |
| 2004/0061319 A1 * | 4/2004 | Saso et al. | 280/741 |
| 2005/0151357 A1 * | 7/2005 | Yamazaki | 280/741 |
| 2005/0161924 A1 * | 7/2005 | Schoenhuber et al. | 280/741 |
| 2005/0194772 A1 | 9/2005 | Numoto et al. | |
| 2005/0230949 A1 | 10/2005 | Blackburn | |
| 2005/0263993 A1 | 12/2005 | Blackburn | |
| 2005/0263994 A1 * | 12/2005 | Quioc | 280/741 |
| 2005/0280252 A1 | 12/2005 | McCormick | |
| 2006/0005734 A1 | 1/2006 | McCormick | |
| 2006/0043716 A1 | 3/2006 | Quioc | |
| 2006/0186653 A1 * | 8/2006 | Schoenhuber | 280/741 |
| 2006/0261584 A1 | 11/2006 | Blackburn | |
| 2006/0273564 A1 | 12/2006 | McCormick et al. | 280/740 |
| 2007/0001438 A1 | 1/2007 | Patterson et al. | 280/740 |
| 2007/0170708 A1 * | 7/2007 | Iwai et al. | 280/736 |
| 2007/0273132 A1 * | 11/2007 | Smith et al. | 280/736 |
| 2008/0067791 A1 * | 3/2008 | Yamazaki | 280/734 |

FOREIGN PATENT DOCUMENTS

| | | |
|---|---|---|
| DE | 42 27547 A1 | 2/1994 |
| EP | 0602785 B1 | 2/1993 |
| EP | 0728633 A1 | 2/1996 |
| EP | 0844149 A1 | 11/1997 |
| EP | 0864470 A1 | 9/1998 |
| EP | 1122134 B1 | 7/2000 |
| EP | 1308353 A2 | 9/2002 |
| JP | 05096147 | 4/1993 |
| WO | WO 98/39183 | 9/1998 |
| WO | WO 2004/091982 A1 | 10/2004 |
| WO | WO 2005/058645 A2 | 6/2005 |
| WO | 2005/086917 | 9/2005 |
| WO | 2006/044516 A2 | 4/2006 |
| WO | 2006/078819 A2 | 4/2006 |

OTHER PUBLICATIONS

Office Action U.S. Appl. No. 11/108,559, filed Apr. 18, 2005 dated for Sep. 27, 2007.

Office Action U.S. Appl. No. 11/140,055, filed May 27, 2005 dated for May 27, 2005.

Office Action U.S. Appl. No. 11/140,055, filed May 27, 2005 dated for Dec. 12, 2007.

Office Action U.S. Appl. No. 11/167,849, filed Jun. 27, 2005 dated for Jan. 14, 2008.

Office Action U.S. Appl. No. 11/358,786, filed Feb. 21, 2006 dated for Mar. 21, 2008.

Office Action U.S. Appl. No. 11/445,859, filed Jun. 1, 2006 dated for Mar. 4, 2008.

Office Action U.S. Appl. No. 11/479,494, filed Jun. 30, 2006 Dated for May 15, 2009 (128).

Office Action U.S. Appl. No. 11/167,849, filed Jun. 27, 2005 dated for Jun. 24, 2009 (88).

Office Action U.S. Appl. No. 11/358,786, filed Feb. 21, 2006 dated for Sep. 18, 2008.

Office Action U.S. Appl. No. 11/445,859, filed Jun. 1, 2006 dated for Sep. 18, 2008.

Office Action U.S. Appl. No. 11/479,494, filed Jun. 30, 2006 Dated for Nov. 12, 2008.

Office Action U.S. Appl. No. 11/167,849, filed Jun. 27, 2005 Dated for Oct. 17, 2008.

* cited by examiner

GAS GENERATOR

CROSS REFERENCE TO RELATED APPLICATIONS

This application claims the benefit of U.S. Application Ser. No. 60/732,569 having a filing date of Nov. 1, 2005.

BACKGROUND OF THE INVENTION

When manufacturing gas generators for gas generating systems, an ongoing challenge includes providing adequate amounts of inflating gas while yet reducing the weight, complexity, and raw materials typically required. Given the weight of a filter assembly often included with many gas generators, a correlating challenge therefore is to provide the same cooling capability while yet reducing the weight of the cooling assembly associated therewith.

SUMMARY OF THE INVENTION

The above-referenced concerns are resolved by a gas generator containing a novel cooling assembly. The cooling assembly includes a baffle assembly that maximizes the gas/contact area interface thereby enhancing the associated cooling and slag deposition/filtering ability. The gases produced upon combustion are shunted radially inwardly toward a second end of the inflator through at least one gas orifice, and then funneled into the baffle assembly located at the second end. The funneling action maximizes the efficiency of the baffle assembly by concentrating the gases at the entry to the baffle assembly. The gases are then forced through the baffle assembly and out the gas generator. The baffle assembly may also contain a filter if desired.

DETAILED DESCRIPTION

Figure 1:
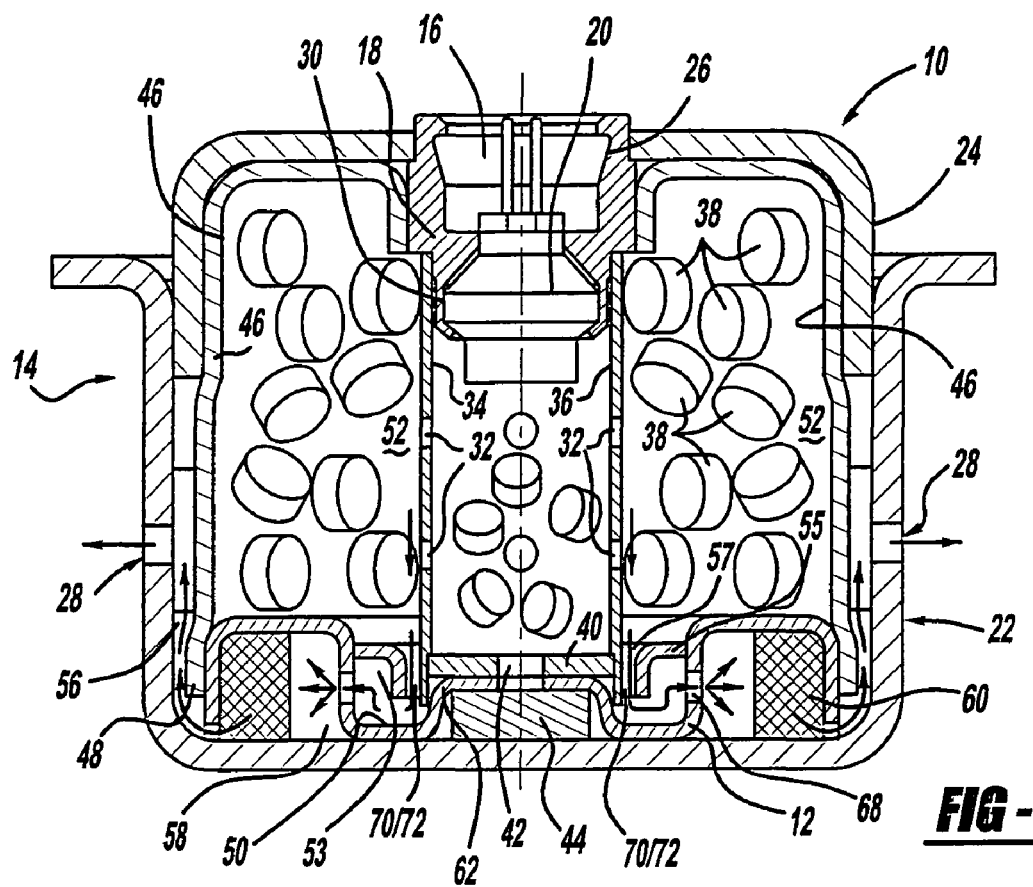
FIG. 1 is a cross-sectional side view of a gas generator incorporating a cooling system in accordance with the present invention.

In accordance with the present invention, FIG. 1 illustrates a gas generator 10 incorporating a cooling system or baffle assembly 12 at an end of the gas generator 10. Gas generator 10 may, for example, be utilized to inflate a vehicle airbag.

As seen in FIG. 1, gas generator or inflator 10 includes a gas generator housing 14 formed by bonding, welding, or otherwise securing together a first housing portion 22 and a second housing portion 24 in a nested relationship. Second housing portion 24 contains an aperture 26 for receiving igniter assembly 16 therein. A plurality of gas discharge apertures 28 are spaced circumferentially around first housing portion 22 to enable fluid communication between an interior of housing 14 and an exterior of the housing. The first and second housing portions may be fabricated (for example, by stamping, casting, forming, or some other suitable process) from a rigid material such as carbon steel or stainless steel.

An igniter assembly 16 is provided for igniting a booster composition 36 (described in greater detail below) in response to an activation signal from a vehicle collision sensing system (not shown). Igniter assembly 16 includes an igniter holder 18 having a cylindrical cavity formed for receiving an igniter 20 therein. Igniter 20 may be secured within the holder cavity using any of a number of known methods, for example, crimping, adhesive application, insert molding, or fasteners. A rear portion of holder 18 is configured to provide an interface mateable with a complementary connector of a wiring harness or other suitable initiator activation signal transmission medium. Holder 18 is formed from a metal or metal alloy using a suitable manufacturing process, such as die casting or machining. Igniter 36 may be formed as known in the art. One exemplary igniter construction is described in U.S. Pat. No. 6,009,809, herein incorporated by reference. Igniter assembly 16 is secured to second housing portion 24 using any of a variety of known methods, such as welding or the formation of an interference fit between holder 16 and a perimeter of upper housing portion aperture 26.

An open end of a generally cylindrical booster tube or perforate housing 30 abuts a portion of igniter holder 18 so as to form a substantially gas-tight seal at the holder-booster tube contact interface. A plurality of gas discharge apertures 32 is spaced circumferentially around a sidewall 34 of booster tube 30 to enable fluid communication between a booster composition 36 contained within booster tube 30 and a primary gas generating composition 38 (also described below) positioned externally of the booster tube interior. In addition, booster tube 30 has an end wall 40 with an aperture 42 formed therein to enable fluid communication between booster composition 36 and an auto-ignition compound 44 (described in greater detail below) positioned along an outer wall of lower housing portion 22. Booster tube 30 is fabricated (for example, by stamping, casting, forming, extrusion, or some other, suitable process) from a rigid material such as carbon steel or stainless steel.

Booster tube 30 contains a quantity of a booster composition 36 ignitable via igniter 20 in a conventional manner to ignite and enhance the burn characteristics of gas generant 38. Referring to FIG. 1, booster composition 36 is positioned within inflator housing 14 so as to enable fluid communication between the booster propellant and primary gas generating composition 38 upon activation of the inflator.

A gas generant containment member or imperforate housing 46 resides between booster tube 30 and perforate body 14. An edge portion 48 of containment member 46 abuts a surface of a filter retainer 50 or second annular member 50 (described below) to form a substantially gas-tight seal at a contact interface between containment member 46 and filter retainer 50, thereby preventing direct fluid communication between combustion chamber 52 and housing gas exit apertures 28. Edge portion 48 is also spaced apart from first housing portion 22 to provide a gas flow passage 56 extending between containment member 46 and first housing portion 22. Passage 56 enables fluid communication between a filter chamber 58 (described below) and housing gas exit apertures 28. Gas generant containment member 46, in conjunction with booster tube 30, a baffle assembly 12, and a filter retainer 50, defines combustion chamber 52 in which primary gas generating composition 38 is positioned. Gas generant containment member 46 is formed from a metal or metal alloy using suitable manufacturing processes, such stamping and forming. Containment member 46 may be press-fit into second housing portion 24 prior to joining housing portions 22 and 24 together.

Gas generant 38 may be any suitable gas generant composition known in the art. Exemplary gas generant compositions include, but are not limited to, those described in U.S. Pat. Nos. 5,035,757, 5,872,329, 5,756,929, and 5,386,775. In the embodiment shown, gas generant 38 is provided in tablet form, but may be provided in other forms.

Filter retainer or second annular member 50 is included within baffle assembly 12 for receiving a filter 60 (described below) therein, and for providing expansion of gases as they pass from a first chamber 53 of the baffle assembly 12. A boss 62 is formed along a central portion of retainer 50. Boss 62 extends into a complementary cavity formed in an end portion of booster tube 30 proximate booster tube end wall 40, thereby centering retainer 50 within housing 14. A portion of retainer 50 also defines a second baffle chamber or filter chamber 58 for positioning and retaining the filter 60 along a gas flow path extending between gas generant 38 and housing apertures 28. In the embodiment shown in FIG. 1, filter chamber 58 is an annular cavity spaced radially outwardly from boss 62. A wall 64 of retainer 50 defining filter chamber 58 includes a plurality of apertures 68 formed therealong to enable fluid communication between gas flow passage 50 (described below) and filter 60. An outer wall of retainer 50 is spaced apart from first housing portion 22 to provide a gas flow passage 60 extending between retainer 50 and first housing portion 22. Filter retainer 50 is fabricated (for example, by stamping, casting, forming, or some other suitable process) from a rigid material such as carbon steel or stainless steel.

Filter 60 is positioned within housing 14 for filtering particulates from gases generated by combustion of gas generant 38. In general, filter 60 is positioned between gas generant 38 and apertures 28 formed along first housing portion 22. In the embodiment shown in FIG. 1, filter 60 is an annular filter positioned within retainer filter chamber 58. The filter may be formed from one of a variety of materials (for example, a carbon fiber or metallic mesh or perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

Baffle assembly 12 includes at least one central orifice 70 adjacent a portion of booster tube 30 for transfer of gases from the combustion chamber 52 to the first chamber 53 of the baffle assembly 12. A plurality of gas orifices 70 may be formed about the perforate housing at the juncture of the baffle assembly 12 and the booster tube 30, or, an annular gas flow passage 72 may be formed at the same juncture to enable fluid communication between combustion chamber 52 and filter retainer apertures 68. Baffle assembly 12 may be fabricated (for example, by stamping or some other suitable process) from a rigid material such as carbon steel or stainless steel. Baffle assembly 12 may be secured to filter retainer 50, for example, by welding or adhesive application.

A quantity of a known auto-ignition material 44 may be positioned within the gas generator 10 so as to enable fluid communication between booster composition 36 and the auto-ignition compound. In the embodiment shown in FIG. 1, auto-ignition material 44 is positioned within a cavity defined by filter retainer boss 62, in contact with an outer wall of first housing portion 22.

During operation of the gas generator 10, igniter 20 activates upon receiving a signal from a vehicle crash sensing system. Activation of igniter 20 results in combustion of booster compound 20. Flame and hot gases from combustion of the booster compound then exit booster tube apertures 32 to ignite gas generant 38. Gases from the combustion of gas generant 38 flow through gas flow passage 72, then into a first chamber 53 of the baffle assembly 12, then through filter retainer apertures 68 into filter chamber 58 for cooling and expansion of the gases, then through filter 60 and out of filter chamber 58, then through gas flow passage 56 to exit housing 14 through apertures 28. As the combustion gases pass through gas flow passage 70/72, through retainer apertures 68, through filter chamber 58, and along first housing portion 22 to exit apertures 28, the gases are cooled and flames are suppressed. Thus, the gas flow path extending between combustion chamber 52 and housing gas exit apertures 28 provides a structure or system for expansion and cooling of the generated gases thereby suppressing flame front, prior to their release into, for example, an inflatable element of a vehicle occupant protection system. Yet another benefit is the reduced weight and packaging space necessary for the baffle assembly 12, notwithstanding the efficacy of the cooling inherent thereto.

Stated another way, in accordance with the present invention, the baffle assembly 12 may be formed by stamping a monolithic part, or, stamping several parts and welding them together. As shown in FIG. 1, a first annular member 55 is either press fit or welded about the periphery of the perforate housing 30. At least one orifice or a plurality of orifices 70, or an annular flow passage 72, are formed at the juncture 57 of the first annular member 55 and the perforate wall or housing 30, thereby providing a radially inwardly toroidal flow of gas once the gas generator 10 is activated. The orifice(s) 70/72 provide a funneling of the gases from the combustion chamber 52 into the baffle assembly 12 upon gas generator 10 activation.

A second annular member 50 may be welded to the first annular member 55 thereby forming a first chamber 53 between housing 30 and filter retainer or second annular member 50. The second annular chamber 54 as defined above, is defined between the retainer 50 radially outwardly toward the body 14, and has a relatively greater volume as compared to the first chamber 53. As such, gases passing from first chamber 53 to second chamber 54 are cooled as they expand and then pass through filter 60. It should be emphasized that although filter 60 is shown in FIG. 1, it may if desired be omitted if the cooling and slag deposition of the baffle assembly 12 is sufficient in and of itself. This determination may be made iteratively depending on the gas generant composition 38 employed.

In operation, gases produced upon activation of the gas generator 10 are funneled or toroidally shunted through the orifice(s) 70/72, thereby maximizing the gas contact with the available surface area within the baffle assembly 12. As a result, flame front is eliminated while optimizing the cooling efficacy of the baffle assembly 12 and thereby reducing the overall relative weight of the assembly 12. As gases pass through the assembly 12, they are substantially cooled prior to passing through passage 56 and out through apertures 28.

Figure 2:
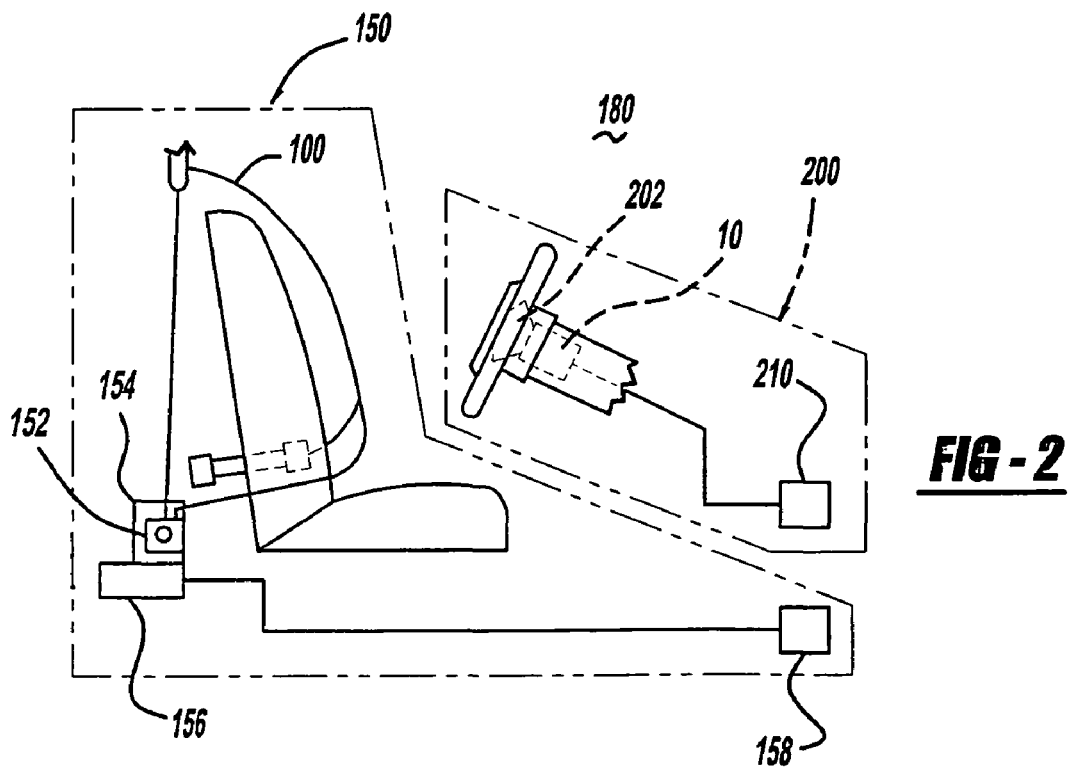
FIG. 2 is an exemplary view of a gas generating system, or a vehicle occupant protection system, in accordance with the present invention.

Referring now to FIG. 2, the exemplary inflator 10 described above may also be incorporated into a gas generating system or airbag system 200. Airbag system 200 includes at least one airbag 202 and an inflator 10 containing a gas generating composition 38 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 2, airbag system 200 may also be incorporated into a broader, more comprehensive vehicle occupant restraint system 180 including additional elements such as a safety belt assembly 150. FIG. 2 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 containing propellant 38 and autoignition 44 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit gas generating systems contemplated in accordance with the present invention. Further, the compositions described above do not limit the present invention.

It should further be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention.

What is claimed is:

1. A gas generator comprising:
   an imperforate housing having a first end and a second end;
   a perforate housing contained within said imperforate housing, said perforate housing having a third end and fourth end adjacent to, and corresponding to said first end and said second end, respectively; and
   a baffle assembly fixed at said second and fourth ends, said baffle assembly comprising at least one orifice adjacent said perforate housing thereby providing fluid communication between said baffle assembly and said imperforate and perforate housings;
   wherein gases produced upon activation of said gas generator are toroidally shunted through said at least one orifice and into said baffle assembly, and then out of said gas generator.

2. A gas generator comprising:
   a perforate body;
   an imperforate housing contained within said body;
   a perforate housing contained within said imperforate housing, said perforate housing containing a first end and a second end;
   a baffle assembly contained within said body at said second end, in fluid communication with said body; and
   at least one orifice formed at a juncture of said perforate housing and said baffle assembly,
   wherein gases produced upon activation are of said gas generator are routed through said at least one orifice, then through said baffle assembly, then through said perforate body.

3. The gas generator of claim 1 wherein said baffle assembly comprises:
   a first chamber in fluid communication with said orifice; and
   a second chamber of greater volume than said first chamber, in fluid communication with said first chamber, for expansion of gases routed therethrough.

4. The gas generator of claim 1 wherein said baffle assembly further contains a filter.

5. The gas generator of claim 2 wherein a plenum is defined between the body and the imperforate housing.

6. A gas generating system comprising the gas generator of claim 1.

7. A vehicle occupant protection system comprising the gas generator of claim 1.

8. The gas generator of claim 1 wherein the baffle assembly is separate from the perforate housing, and wherein a portion of the baffle assembly is spaced apart from the perforate housing so as to define at the least one orifice therebetween.

9. The gas generator of claim 1 further comprising a perforate body having at least one gas discharge aperture formed therein to enable fluid communication between an interior of the body and an exterior of the body after activation of the gas generator, and wherein generated gases pass completely through the baffle assembly prior to reaching the at least one gas discharge aperture.

10. The gas generator of claim 2 wherein the at least one orifice enables fluid flow through said at least one orifice and into said baffle assembly prior to activation of the gas generator.

* * * * *